United States Patent [19]

Tamaki et al.

[11] Patent Number: 5,730,238
[45] Date of Patent: Mar. 24, 1998

[54] CONTROL METHOD OF ELECTRIC CAR

[75] Inventors: Satoshi Tamaki, Hirakata; Yasufumi Ikkai, Kobe; Masaki Tagome, Osaka, all of Japan

[73] Assignee: Matsushita Electric Industrial Co., Ltd., Osaka-fu, Japan

[21] Appl. No.: 646,829

[22] Filed: May 21, 1996

[30] Foreign Application Priority Data

May 24, 1995 [JP] Japan ................ 7-124812

[51] Int. Cl.$^6$ ................ B60L 3/04; B60L 15/20
[52] U.S. Cl. ................ 180/65.8; 318/139; 364/424.026
[58] Field of Search ................ 180/65.1, 65.8; 364/424.026; 318/139, 587

[56] References Cited

U.S. PATENT DOCUMENTS

| | | | |
|---|---|---|---|
| 5,444,340 | 8/1995 | Tamaki et al. | 318/139 |
| 5,471,384 | 11/1995 | Nakashima et al. | 180/65.8 X |
| 5,495,908 | 3/1996 | Obara et al. | 180/65.8 |
| 5,610,483 | 3/1997 | Obara et al. | 318/139 |

*Primary Examiner*—F. J. Bartuska
*Attorney, Agent, or Firm*—Panitch Schwarze Jacob & Nadel, P.C.

[57] ABSTRACT

By processing in a control processor 71 signal indicating the amount or degree of pushing-down of the accelerator pedal 2a and signals indicating the non pushing down and full pushing-down of the acceleration pedal 2a, the control unit 7 executes the judgment for determining whether the detected accelerator state is normal or anomalous. In case of judgment of "normal", a usual motor control is executed, whereas in case of judgment to be "anomaly", the system is tentatively designated to be "a state under which the anomaly is being detected". After a specified time lapse, a rejudgement operation is executed, and further when the anomaly is not solved even in this rejudgement operation, the situation is regarded to be a "real anomaly", and an anomaly procedure e.g. to stop current to the motor is executed. When the anomaly state is solved in the rejudgement operation, it is judged to be normal again.

6 Claims, 5 Drawing Sheets

FIG. 2 (General Art)

5,730,238

CONTROL METHOD OF ELECTRIC CAR

FIELD OF THE INVENTION AND RELATED ART STATEMENT

1. Field of the Invention

The present invention relates to a method for controlling the motor torque output wherein controlling is performed by detecting signals indicating the degree of pedal pushing-down, a full pushing-down signal, and a no pushing-down signal.

2. Description of the Related Art

Heretofore, when an electric car driver operated an accelerator pedal, torque and other items to be sent to an electric motor were computed from signals that were responding to the state of the accelerator pedal. Thereby a torque instruction was issued to an inverter and other necessary parts, thus attaining a control of the motor of the electric car.

Responding to the purpose of detecting such accelerator pedal state, an acceleration unit were used. The acceleration unit comprises a sensor for detecting the amount or degree of pedal pushing-down of an accelerator pedal and a limit switch for detecting a fully pushing-down or a non pushing-down state of the accelerator pedal.

The switch makes connection with either contact-point of the limit switch conductive by the action of a wire connected to the accelerator pedal and issues contact-point signals. And, the sensor, which is a potentiometer, issues a voltage value corresponding to displacement of the wire responding to the degree of pushing-down of the accelerator pedal.

In the conventional electric car, depending on "normal" or "anomalous" for all the signals out of the acceleration unit 2, control of a motor of the electric car has been accomplished as is described below.

That is, a control unit judges two states whether respective signals of the acceleration unit 2 are "normal" or "anomalous". When the signal are judged "normal", a current instruction value responding to the amount of push-down of the accelerator pedal 2a is computed, and the motor is controlled in accordance with a torque value obtained. On the other hand, when it is judged to be "anomalous", any appropriate necessary operation such as cutout of the inverter is made.

In the prior art configuration described above, the driving control of the inverter is accomplished in accordance with only such two states that the signals of the acceleration unit 2 are normal or anomalous. Such prior art brings problems described below on the point of appropriate motor control of an electric car.

That is, for instance, a lapse of time from detecting an anomalous state to judging of "anomaly" on the occasion of detecting necessitates, some troubles may arise. For example, in spite of the state that the pedal is pushed down, due to such a factor as vibrations of car caused by running on a bumpy road, chatterings often take place on the contact-point for sensing the total-close.

In this case, the control unit 7 cannot perform any immediate appropriate judgment whether the chattering is caused by the vibration or caused by any defect of the switch 2c. Therefore, the judgment whether the system is normal or defective must be done from one-sided determination.

Under such situation, when the motor control is done with only those two states of normal and anomaly, there may be the problem. That is, if chattering or the like unstable factor as mentioned above is disregarded, a certain degree of danger may be necessarily accompanied. On the other hand, if such unstable factor is immediately regarded as an anomaly state, it may cause excessively frequent interruptions of motor operation, thereby causing hindrance on a smooth motor operation.

Therefore, it has long been desired to provide a control method of an electric car by which, without giving any inconvenience on the driving, a safe and smooth car driving can be realized.

OBJECT AND SUMMARY OF THE INVENTION

The present invention purposes to solve the above-mentioned problems, and is to offer such a control method of a motor of an electric car that an appropriate control responding to the state of an accelerator pedal can be attained.

According to the present invention, by executing an appropriate motor control responding to the accelerator pedal state, the electric car can be driven smoothly and safely.

In order to solve the above-mentioned problems of the prior art, a method of motor control of an electric car comprises:

- step of making a judgment whether the detected state of acceleration system is normal or anomalous by examining relations of the pedal push-down degree signal with a first signal indicating full pushing-down of the accelerator pedal, and with a second signal indicating non pushing-down of the accelerator pedal,
- step of carrying out usual acceleration control, when the judgment is normal,
- step of, when the judgment is anomaly, tentatively judging the state being under anomaly detecting state, and then after a specified time lapse, executing a rejudgment operation, and
- step of, when the anomaly is not solved even in this rejudgment operation, regarding the situation to be a real anomaly and executing an anomaly procedure; whereas, when the anomaly state is solved in the rejudgment operation, making a judgment to be normal again, whereby executing the motor controlling.

In order to execute the above-mentioned method, an apparatus for motor control of an electric car comprises:

- means for producing a pedal pushing-down degree signal of an accelerator pedal,
- means for producing a signal indicating full pushing-down of the accelerator pedal and also a signal of non pushing-down of the accelerator pedal,
- means for making a judgment whether the detected state of the acceleration system is normal or anomalous by receiving, and examining relations of, the pedal pushing-down degree signal with a signal indicating full pushing-down of the accelerator pedal, and with a signal indicating non pushing-down of the accelerator pedal,
- means for carrying out usual acceleration control, when the judgment result is normal,
- means for, when the judgment result is anomaly, tentatively judging the state being under anomaly detecting state, and then after a specified time lapse, executing a rejudgment operation, and
- means for, when the anomaly is not solved even in this rejudgment operation, regarding the situation to be a real anomaly and executing an anomaly procedure;

whereas, when the anomaly state is solved in the rejudgment operation, making a judgment to be normal again, whereby executing the motor controlling.

And, during a period an anomaly is being detected, it is preferable to execute the motor control instruction to make the output torque for the motor to be zero.

In accordance with present invention, the following action can be achieved. That is, when the accelerator pedal state is judged to be anomalous, tentatively it is designated to be a state under which anomaly is being detected. Then after a specified time lapse, a rejudgement operation is executed, and further when the anomaly is not solved even in this rejudgement operation, it is regarded to be a real anomaly. In doing this, the state of the accelerator system is classified into three different states of (i) a normal state, (ii) a state under which the anomaly is being detected, and (iii) an anomalous state. And a motor controls which are suitable for respective states can be realized.

And, during the time period in which an anomaly state is being detected, the motor control instruction to make the motor output torque to zero is executed. Thereby, during the time period under which a clear judgment for determining the state normal or anomaly cannot be obtained, the electric car is kept running with its inertia. Then, when it is judged normal again in the rejudgement operation, the control turns back to the normal state. And then, the torque instruction for the motor responding to the amount of push-down of the accelerator pedal is issued. Therefore, it is possible to avoid such an inconvenience that the control is switched to the anomalous state notwithstanding to the absence of real defect. Accordingly, a smooth driving of an electric car can be achieved successively.

In order to better solve the problems of the prior art, method of another aspect of the invention for performing a motor control of an electric car comprises:

step of making a judgment whether the detected state of acceleration system is normal or anomalous by examining relations of a pair of pedal push-down degree signals with a pair of first signals indicating full pushing-down of the accelerator pedal, and with a pair of second signals indicating non pushing-down of the accelerator pedal, step of carrying out usual acceleration control, when the judgment is normal, step of, when the judgment is anomaly, tentatively judging the state being under anomaly detecting state, and then after a specified time lapse, executing a rejudgment operation, and step of, when the anomaly is not solved even in this rejudgment operation, regarding the situation to be a real anomaly and executing an anomaly procedure; whereas, when the anomaly state is solved in the rejudgment operation, making a judgment to be normal again.

whereby executing the motor controlling.

In order to execute the above-mentioned method of another aspect, an apparatus for motor control of an electric car of another aspect comprises:

first and second degree signal means each for producing a pedal pushing-down degree signal of an accelerator pedal, first and second means each for producing a signal indicating full pushing-down of the accelerator pedal and also a signal of non pushing-down of the accelerator pedal, means for making a judgment whether the detected state of the acceleration system is normal or anomalous by examining relations of a pair of pedal pushing-down degree signals from the first and second degree signal with a pair of signals indicating full pushing-down of the accelerator pedal, and with a pair of signals indicating non pushing-down of the accelerator pedal, means for carrying out usual acceleration control, when the judgment result is normal, means for, when the judgment result is anomaly, tentatively judging the state being under anomaly detecting state, and then after a specified time lapse, executing a rejudgment operation, and means for, when the anomaly is not solved even in this rejudgment operation, regarding the situation to be a real anomaly and executing an anomaly procedure; whereas, when the anomaly state is solved in the rejudgment operation, making a judgment to be normal again, whereby executing the motor controlling.

According to the above-mentioned another or second aspect of the present invention the below-mentioned technical advantage is achieved. That is, similarly to the above-mentioned first aspect of the invention the control unit classifies the states of the accelerator system by using parallelly provided two systems into three different states: (i) normal state, (ii) state under which anomaly is being detected, and (iii) anomalous state. Then the motor is controlled by the combinations of respective states of the two parallel systems. For example, in case that one system is judged to be in the state under which anomaly is being detected while the other system is judged to be in the normal state, a priority is given to the "normal". Then, the motor can be controlled rationally.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
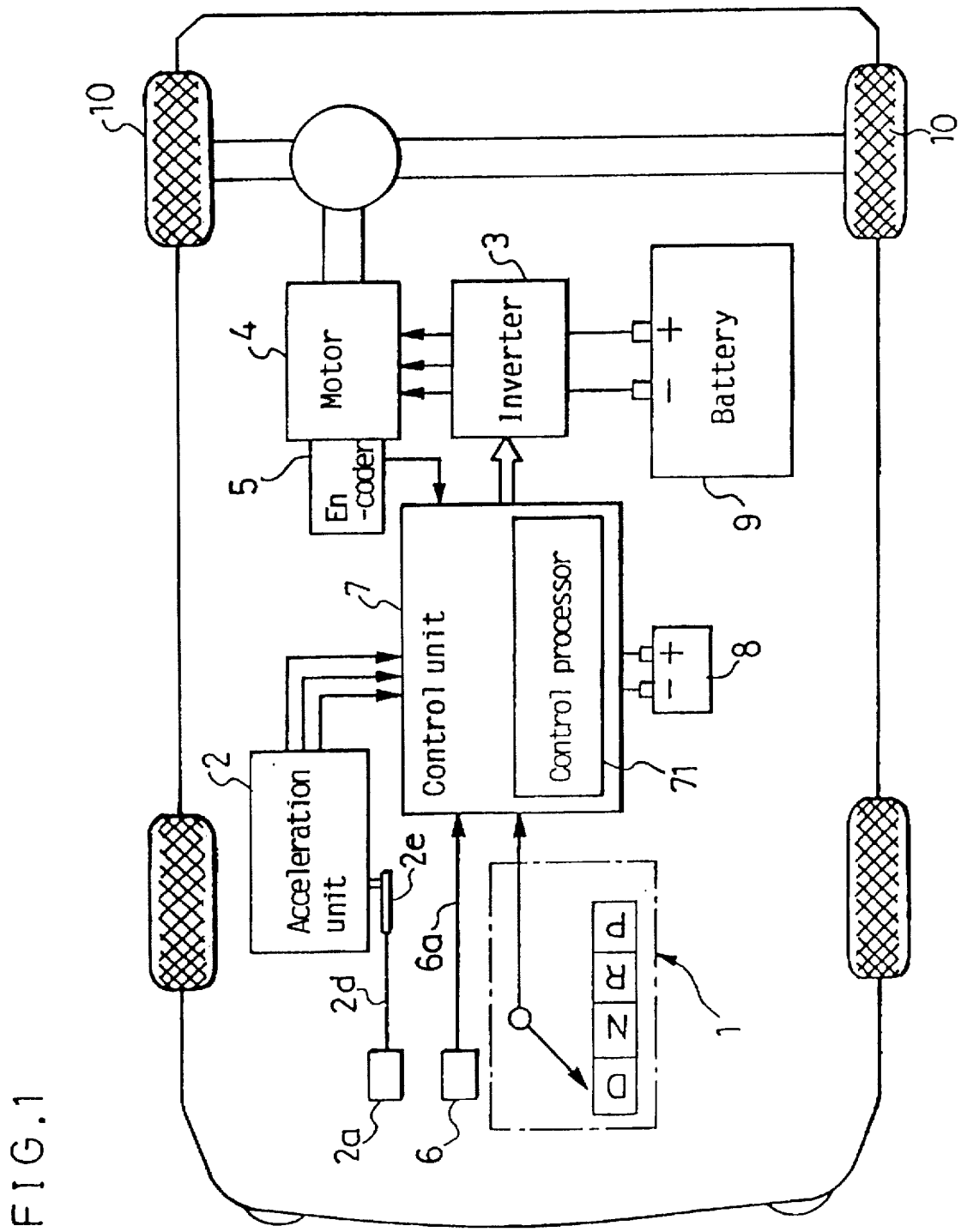
FIG. 1 is a drawing of a combination of a block diagram showing a circuit configuration of an electric car and a conceptual plan views thereof of an embodiment of a first embodiment of the present invention.
Figure 2:
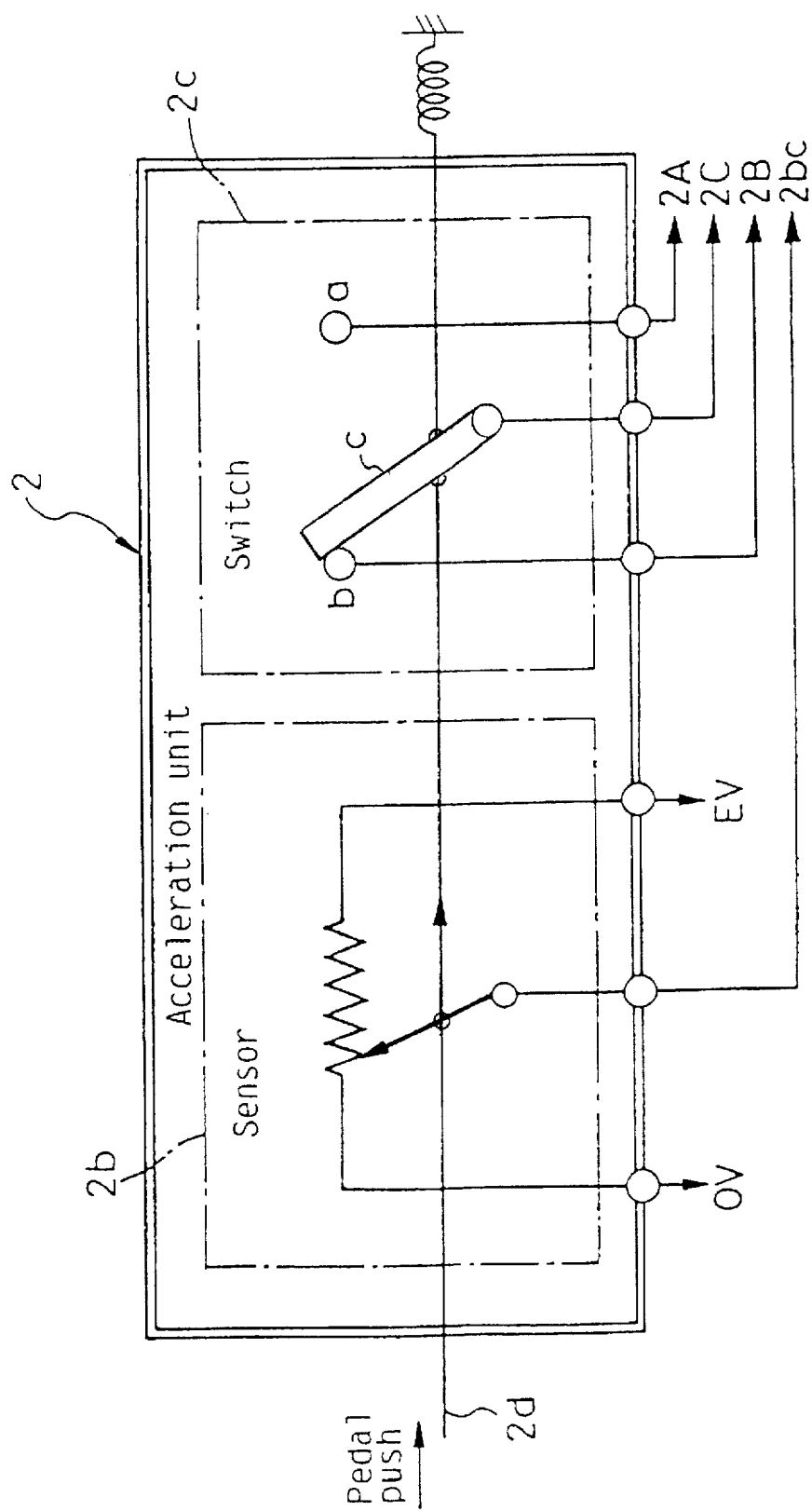
FIG. 2 is a circuit drawing of an acceleration unit of the electric car of FIG. 1.

In the following, detailed explanation is given on a first embodiment of the present invention, referring to the drawings. FIG. 1 and FIG. 2 show a first embodiment. An electric car schematically shown in FIG. 1 is provided with: an acceleration unit 2 for issuing a signal of degree or amount of pushing-down of a accelerator pedal 2a, a signal of full pushing-down of the accelerator pedal 2a, and a signal of non pushing-down of the acceleration pedal 2a; and a control unit 7 which controls motor 4 through an operation of a control processor 71 and an inverter 3, by detecting respective states of the shift-position of a shift mechanism 1, state of a signal of a break pedal 6, state of the above-mentioned acceleration unit 2 and state of others. Responding to the reception of the instruction of this control unit 7, an inverter 3 drives the motor 4 by using an electric power source of a driving battery 9.

Thereby, the control unit 7 gives the inverter 3 a torque instruction of, such as, amount of output current and its frequency.

The inverter 3 performs the PWM (Pulse Width Modulation) switching operation in accordance with the above-mentioned torque instruction and drives the motor 4 using the power source of the battery 9. The electric car runs driven by the rotation of driving wheels 10 provided at the rear part of the car for example, and the motor 4 drives the driving wheels 10.

And the acceleration unit 2 is provided with a sensor 2b for detecting the degree of the opening of the accelerator pedal 2a, a switch 2c for detecting pedal free state (non pushing-down state) and the totally pedal pushing state (full pushing-down state), and a wire 2d for displacing the states of the sensor 2b and the switch 2c by linking with the accelerator pedal 2a.

The output of such acceleration unit 2 gives, (1) under a situation in which a driver remove his foot from the accelerator pedal 2a (non pushing-down state), a voltage of 0 volt as voltage output from the sensor 2b and a voltage output corresponding to the state of normal-close contact "b" resulted by touching of the moving contact C to the normal-close contact "b" of the switch 2c. And (2) when a driver pushes the accelerator pedal 2a to a middle position, a middle voltage value from the sensor 2b corresponding to the amount of the half pushing-down is issued from the output terminal 2bc, and a voltage of the noncontact state output from the moving contact C of the switch 2c are issued. Furthermore, (3) when the driver fully pushes the accelerator pedal 2a, i.e., completely to the full pushing-down position, a maximum voltage EV is issued from the sensor 2b, and a voltage of the normal-open contact "a" is output at the terminal 2A connected to the normal open open contact "a" from the switch 2c.

Those signals issued from the acceleration unit 2 as has been described above of an electric car are inputted into the control unit 7 (FIG. 1) of the electric car.

Hereupon, depending on the state of the sensor 2b and that of the switch 2c in the acceleration unit 2, even during the period in which the pedal 2a is being pushed down, due to a factor such as a big vibration caused by a running of the car over a bumpy road, for example, there happens a case that chattering takes place on the contact-point of the total-close side.

[In anomalous state wherein chattering takes place on the normal-open contact "a"]

Figure 3:
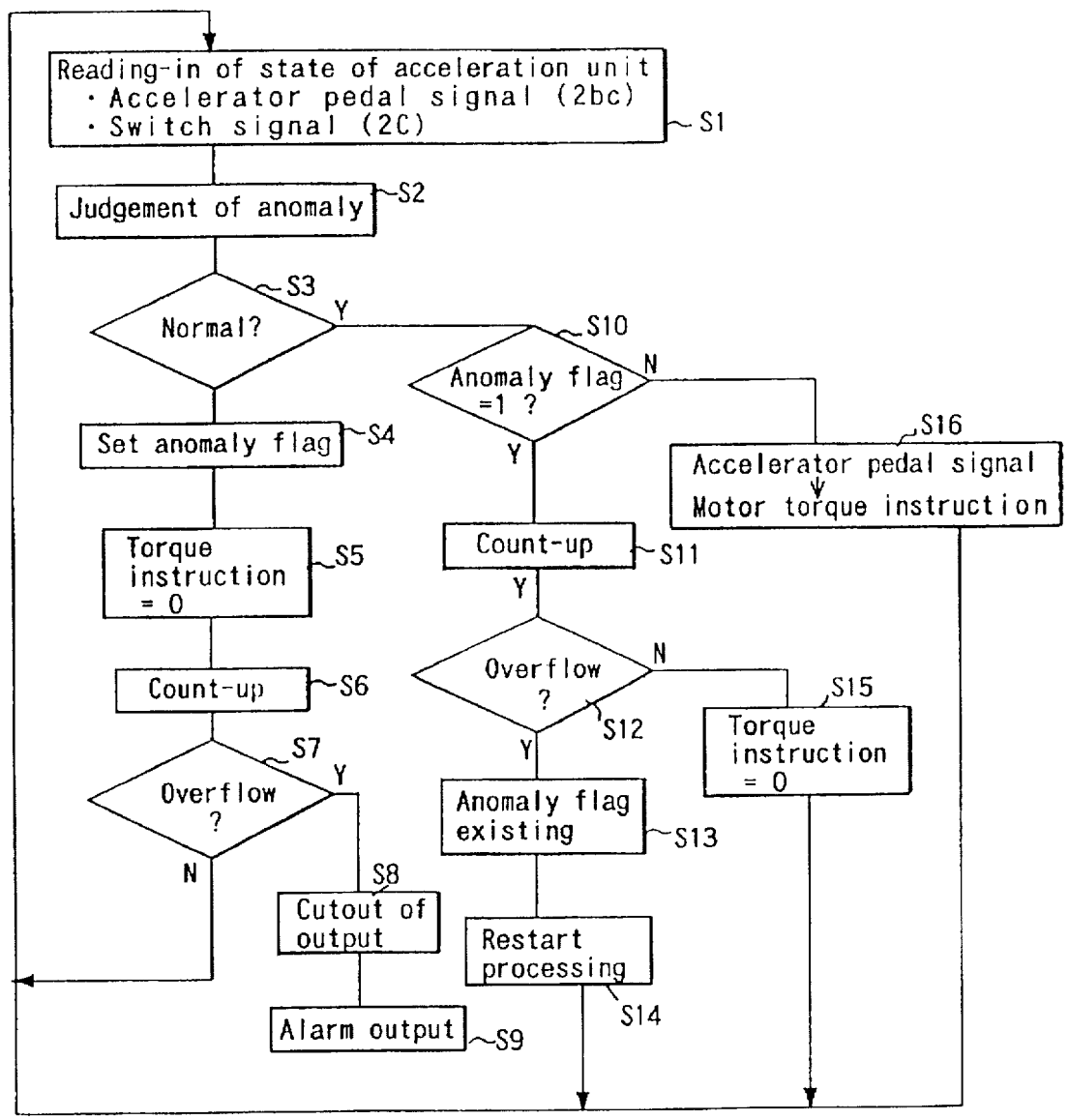
FIG. 3 is a flow chart showing the operation of a first embodiment.

In the prior art case that chattering takes place in the circuit of the control apparatus of prior art, the judgment for determining whether the chattering might be caused by the vibration or caused by any defect of the switch 2c could not be made immediately. In such case in general, the prior art apparatus has been made only one-sided judgment whether it was normal or defect. However, in the control method in accordance with the present invention, actions shown in a flow chart of FIG. 3 are executed by a computation processing apparatus 71 in the control unit 7. Therefore, even under such situation as mentioned above, an appropriate control of the motor 4 is performed. That is, the control of the motor 4 is performed by dividing the situation into three different states as shown in Table 1.

TABLE 1

| Signal states of acceleration unit | Normal | Anomaly is being detected | Anomaly |
|---|---|---|---|
| Control of motor | torque control | torque = 0 | cutout of output |

That is, judgment for determining whether the state of the accelerator pedal 2a detected by the control unit 7 is normal or anomalous is executed (steps S1 to S3 of FIG. 3). In case that the anomalous state is detected, the state is allotted to be a state under which "anomaly is being detected" in Table 1 (S4 to S7). In this case, the control unit 7 issues an instruction of making the output torque to the motor zero for a predetermined time period (S4 to S9).

In the output state of zero torque, the electric car is turned to an "inertial running state that is restartable any time" (S10 to S15).

During this period in which the instruction is zero torque, the control unit 7 executes rejudgement operations on the accelerator pedal through the acceleration unit several times at a specified time interval. And, in case that the relation of situation in the accelerator pedal 2a and the switch 2c doesn't return to a stable normal state in the repetitive rejudgement operations, cutting out of the output from the inverter 3 which is indicted as "cutout of output" in Table 1 is executed, and at the same time a warning is issued (S8 to S9). Hereupon, issuing of warning or alarm can be any procedure to announce the anomaly to a driver such as a turning on of a warning lamp.

For the electric car in which the power from the inverter 3 is cut out, any continuation of running of the car is dangerous, and therefore running is stopped after a certain time period of inertial running.

[Case that the anomaly is solved]

In case that the anomalous state (e.g. chattering) is solved, the rejudgement operation (S10) on the accelerator pedal and the acceleration unit is executed several times at a specified time interval unit. And by this rejudgement operation, when signal state which was judged to be normal three times successively is obtained (S11, S12), the situation is judged that it was not caused by any defect on the accelerator pedal 2c nor on the acceleration unit 2, and that the relation between the accelerator pedal 2a and the switch 2c returned back to a certain original stable state (S13).

Then, the control unit 7 executes a "restart" process (S14). As a result, the instruction of torque of the motor 4 responding to the amount of push-down of the accelerator pedal 2c is issued out, thereby making the motor to the normal running state (S16). Thus, the running of the car is restored.

The above-mentioned "restart" process is defined as a process in which the torque is raised up gradually from zero to a torque corresponding to the amount of the push-down of the accelerator pedal 2a.

There is a possibility that the "judgment whether the chattering of the switch 2c is caused by the vibration due to the roughness of the road surface or caused by any defect of the switch 2c" cannot be done immediately. According to the present embodiment, the control of the motor 4 is not interrupted, and even in such case the control is continued without interruption by instructing the torque to the motor 4 to be zero. And the car running is kept in its inertia. By such configuration and operation, as soon as the normal state is confirmed, the normal car driving can be restarted rapidly.

[Second Embodiment]

Figure 4:
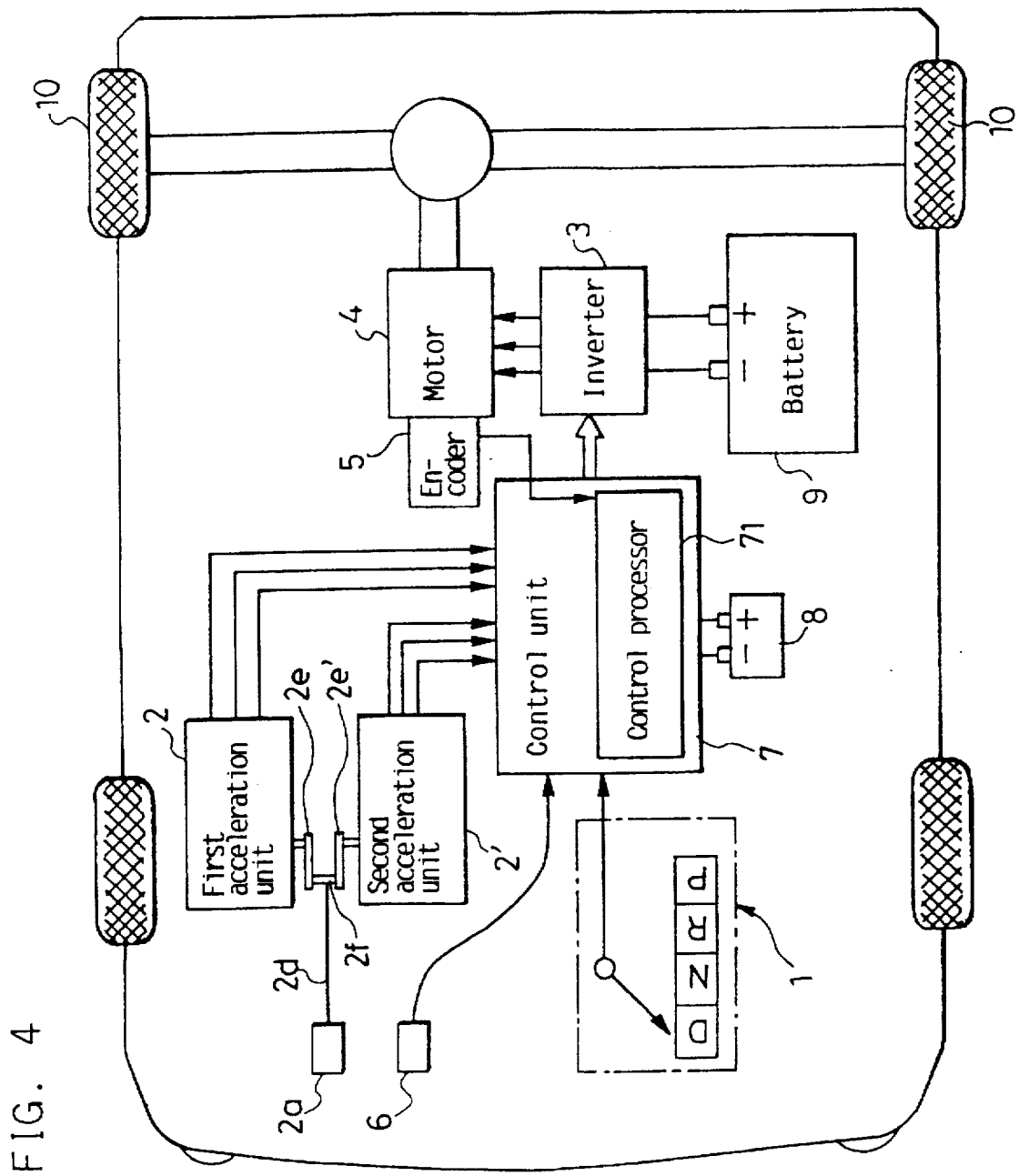
FIG. 4 is a drawing of a combination of a block diagram showing a circuit configuration of an electric car and a conceptual plan views thereof of an embodiment of a second embodiment of the present invention.

Next, explanation is given on a second embodiment of the present invention referring to Table 2 and FIG. 4.

The second embodiment is, as is shown in FIG. 4, characterized by provision of a pair of parallelly working acceleration units 2 and 2' for controlling the motor. A first acceleration unit 2 and a second acceleration unit 2', which are mechanically ganged by levers 2e, 2e' and a connecting rod 2f connecting therebetween, and are further connected to a accelerator pedal 2a through a common wire 2d. By using control states obtained by the pair of acceleration unit 2 and 2', and combining respective three different control states (normal, anomaly, and anomaly is being detected) of the two acceleration units 2 and 2' as shown in the below-mentioned Table 2, the motor 4 is controlled reliably.

Since the configuration of this second embodiment shown in FIG. 4 is substantially the same except the two acceleration units, the same notations are given on common parts shown in Table 2, and redundant detailed explanations thereon are omitted..LS1

TABLE 2

|  |  | Acceleration unit 2 | | |
| --- | --- | --- | --- | --- |
|  |  | Normal | Anomaly is being detected | Anomaly |
| Accelerator unit 2' | Normal | torque control | acceleration unit 2' | acceleration unit 2' |
|  | Anomaly is being detected | acceleration unit 2 | torque = 0 | torque = 0 |
|  | Anomaly | acceleration unit 2 | torque = 0 | cutout of output |

Figure 5:
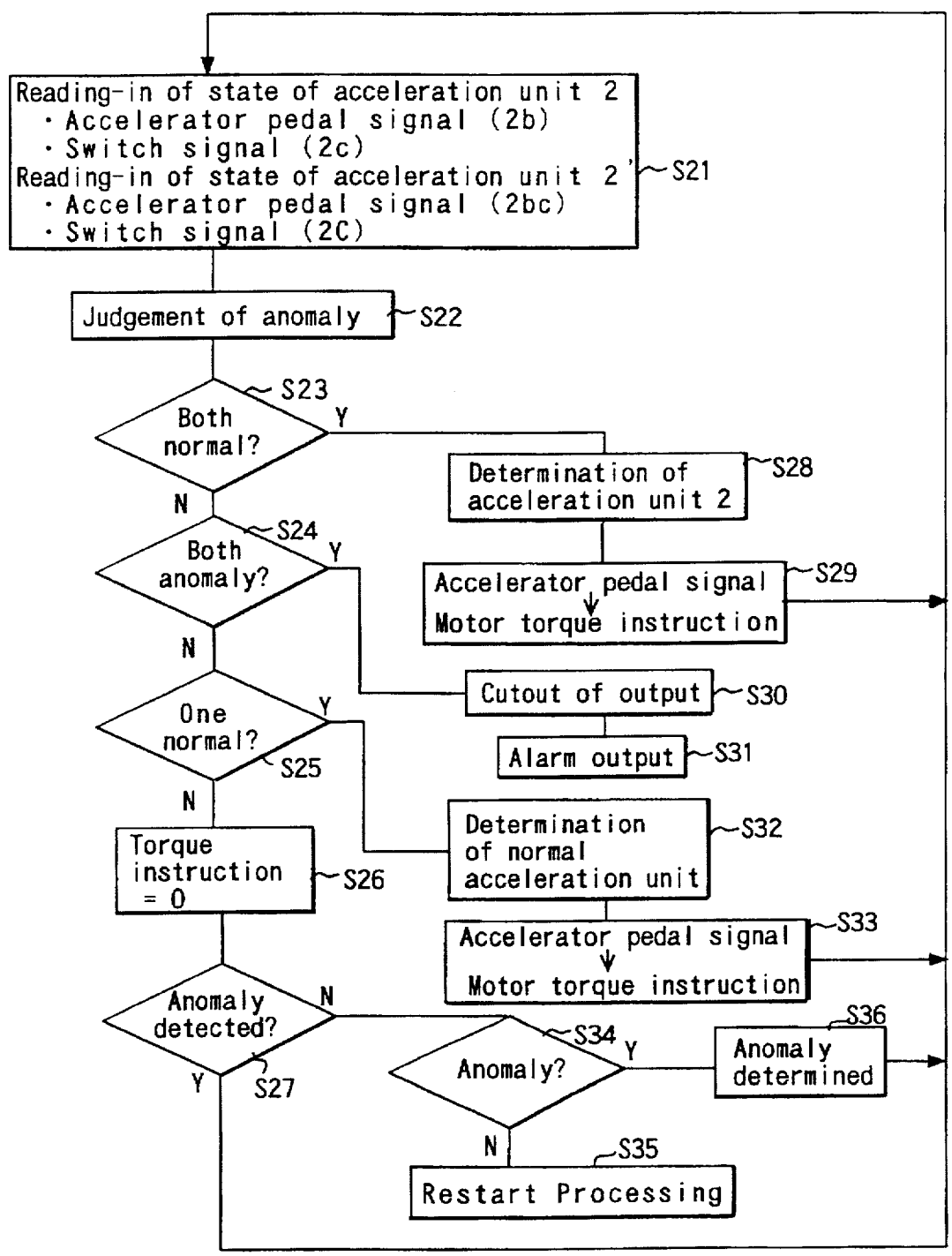
FIG. 5 is a flow chart showing the operation of a second embodiment.

Table 2 is a table showing respective control methods corresponding to respective states of the acceleration unit 2 and the acceleration unit 2' in the second embodiment. FIG. 5 is a flow chart for realizing the contents of Table 2, and its operations are executed by a control processor 71 which is a computation processing unit.

From each of the acceleration unit 2 and 2', signals of three different states of normal state, anomalous state, and state under which anomaly is being detected are obtained, are given to the control unit 7, which judges respective states shown in Table 2. The control states of the control unit 7 are divided into five different patterns shown in the Table 2, to determine the control method of the motor 4.

A first pattern is a process for the case that signals from both of acceleration units 2 and 2' are normal (S23 in FIG. 5). In this pattern, for example, either of lower input level among sensors 2b and 2b' or an average value of those two input levels is used, and therewith an instruction torque is computed to control the motor 4. That is, a normal running control is executed responding to the amount of push-down of the accelerator pedal 2a (S28, S29).

A second pattern is for a process for the case that either one of signals from the acceleration units 2 or 2' is normal (S25). Using one acceleration unit issuing a normal signal, that is, by using either one of the first acceleration unit 2 or the second acceleration unit 2' (S32), the instruction torque is computed to control the motor 4. Thereby, a normal running control is executed responding to the amount of pushing-down of the accelerator pedal 2a which was obtained from the normal acceleration unit (S33).

A third pattern is for a process for the case that both signals from the acceleration units 2 and 2' are anomalous (S24). Since the situation is that any normal signal cannot be obtained from the acceleration units 2 and 2', anomaly procedure are executed such that cutout of output of the inverter 3 and turning on of a warning lamp. Thus, the motor control using signals from the acceleration units 2, 2' is interrupted and the car running is stopped after a certain period of inertial running of the car (S30, S31).

A fourth pattern is for a process for the case that either one signal from the acceleration units 2 or 2' is anomalous and that the other one signal is in the state of the anomaly is being detected (S27 to S36). The acceleration unit under the anomalous state cannot be used to control the motor 4. Furthermore, the signal from the other acceleration unit is in the state of anomaly is being detected. Therein the judgment for determining whether it is normal or anomaly cannot be made. At this time the control is executed by making the instruction torque for the motor 4 zero (S26). That is the electric car keeps its restartable inertial running. And during this process, rejudgement is executed on the signals which are resulted by the state of the accelerator pedal 2a and the switch 2c and given from the acceleration unit which is in the state that anomaly is being detected.

A fifth pattern is for a process for the case that both signals from the acceleration units 2 and 2' are in the state under which anomaly is being detected (S27). In this case, the situation is in the state under which anomaly is being detected wherein the judgment for determining whether it is normal or anomalous cannot be made yet. Therefore, the control is executed by making the instruction torque for the motor 4 zero (S26), similarly as in the fourth pattern. That is, the electric car is left keeping its restartable inertial running. And, during this process, rejudgement are made respectively on the signals from sensors 2b and respective switches 2c of two acceleration units 2 and 2', which both are in the state "under which anomaly is being detected" (S27).

As has been described above, by making control of the motor 4 using the acceleration units 2 and 2', even when either one system is broken the control unit 7 can make a right judgment on the state of the accelerator pedal 2a, since right signals are given from one acceleration unit that keeps the normal operation. When any anomaly is detected, it is possible to issue the instruction of making the output torque for the motor zero for a certain specified time period (S26).

Then, during the time period while the torque instruction is kept zero, judgment for determining whether the anomaly is solved or not is executed. In case that the anomaly is not solved, the output is cut out and a warning is issued (S30, S31). On the other hand, in case that the anomaly is solved, it is judged to be normal again. In this case, by issuing the torque control instruction for the motor 4 responding to the amount of the pushing-down of the accelerator pedal (S32, S33), a smooth driving of the car can be continued.

As has been described above, according to the second embodiment, the motor control can be carried out in a more reliable and effective manner than in the first embodiment.

Hereupon, in the present embodiment, although the procedure for the case of anomaly in the cutout of the inverter 3 and/or turning-on of the warning lamp, it is also possible to use any other process such as sounding an alarm. In the embodiment the restarting is made from the process under which the anomaly is being detected, in gradual rise up of the torque current instruction for the motor 4. However, it is also possible to take such another process of smoothly adjusting the car speed by detecting such as the running speed of the car. Or alternatively it is also possible to design the control processor 71 so as to take such step that when the anomaly is being detected, an alarm is issued to a driver, and in order to leave the control to the driver's will, after detecting the total-off (non pushing-down) state of the accelerator pedal, the driver is allowed to restart the motor. Therefore, the driver can control the state of the motor by his/her own will. Moreover, those sensors 2b and switches 2c in respective acceleration units 2 and 2' need not be exactly the same on their type; or their installation position or direction need not be the same.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. In a method of controlling a motor of an electric car by detecting the state of an acceleration system through signal of pushing-down degree of an accelerator pedal and signals indicating full and non pushing downs of the accelerator pedal, the method comprising:

step of making a judgment whether said detected state of acceleration system is normal or anomalous by examining relations of said pedal pushing-down degree signal with a first signal indicating full pushing-down of the accelerator pedal, and with a second signal indicating non pushing-down of the accelerator pedal, step of carrying out usual acceleration control, when the judgment is normal, step of, when the judgment is anomaly, tentatively judging the state being under anomaly detecting state, and then after a specified time lapse, executing a rejudgment operation, and step of, when the anomaly is not solved even in this rejudgment operation, regarding the situation to be a real anomaly and executing an anomaly procedure; whereas, when the anomaly state is solved in the rejudgment operation, making a judgment to be normal again, whereby executing the motor controlling.

2. A method of controlling a motor of an electric car in accordance with claim 1, in which during the time under anomaly detecting state a motor control instruction for making the output torque of the motor zero is executed.

3. A method of controlling a motor of an electric car by detecting the state of an acceleration system having a pair of acceleration units each issuing signal of pushing-down degree of an accelerator and signals indicating full and non pushing downs of the accelerator pedal, the method comprising:

step of making a judgment whether said detected state each unit of acceleration system is normal or anomalous by examining relations of a pair of pedal pushing-down degree signals with a pair of signals indicating full pushing-down of the accelerator pedal, and with a pair of signals indicating non pushing-down of the accelerator pedal, step of carrying out usual acceleration control, when the judgment is normal, step of, when the judgment is anomaly, tentatively judging the state being under anomaly detecting state, and then after a specified time lapse, executing a rejudgment operation, and step of, when the anomaly is not solved even in this rejudgment operation, regarding the situation to be a real anomaly and executing an anomaly procedure; whereas, when the anomaly state is solved in the rejudgment operation, making a judgment to be normal again.

whereby executing the motor controlling.

4. An apparatus for controlling a motor of an electric car by detecting the state of an acceleration system comprising:

means for producing a pedal pushing-down degree signal of an accelerator pedal, means for producing a signal indicating full pushing-down of said accelerator pedal and also a signal of non pushing-down of said accelerator pedal, means for making a judgment whether said detected state of said acceleration system is normal or anomalous by receiving, and examining relations of, said pedal pushing-down degree signal with a signal indicating full pushing-down of the accelerator pedal, and with a signal indicating non pushing-down of the accelerator pedal, means for carrying out usual acceleration control, when the judgment result is normal, means for, when the judgment result is anomaly, tentatively judging the state being under anomaly detecting state, and then after a specified time lapse, executing a rejudgment operation, and means for, when the anomaly is not solved even in this rejudgment operation, regarding the situation to be a real anomaly and executing an anomaly procedure; whereas, when the anomaly state is solved in the rejudgment operation, making a judgment to be normal again, whereby executing the motor controlling.

5. An apparatus for controlling a motor of an electric car in accordance with claim 4, in which during the time under anomaly detecting state a motor control instruction for making the output torque of the motor zero is executed.

6. A apparatus for controlling a motor of an electric car by detecting the state of an acceleration system comprising:

first and second degree signal means each for producing a pedal pushing-down degree signal of an accelerator pedal, first and second means each for producing a signal indicating full pushing-down of said accelerator pedal and also a signal of non pushing-down of said accelerator pedal, means for making a judgment whether said detected state of said acceleration system is normal or anomalous by examining relations of a pair of pedal pushing-down degree signals from said first and second degree signal with a pair of signals indicating full pushing-down of the accelerator pedal, and with a pair of signals indicating non pushing-down of the accelerator pedal, means for carrying out usual acceleration control, when the judgment result is normal, means for, when the judgment result is anomaly, tentatively judging the state being under anomaly detecting state, and then after a specified time lapse, executing a rejudgment operation, and means for, when the anomaly is not solved even in this rejudgment operation, regarding the situation to be a real anomaly and executing an anomaly procedure; whereas, when the anomaly state is solved in the rejudgment operation, making a judgment to be normal again, whereby executing the motor controlling.

* * * * *